United States Patent [19]

Zeunen

[11] 4,212,533
[45] Jul. 15, 1980

[54] PHOTOGRAPHIC EXPOSURE APPARATUS

[76] Inventor: Barthel Zeunen, 4750 Clarkston Rd., Clarkston, Mich. 48016

[21] Appl. No.: 10,628

[22] Filed: Feb. 9, 1979

[51] Int. Cl.² .......................................... G03B 27/20
[52] U.S. Cl. ...................................... 355/91; 355/103
[58] Field of Search ................... 355/78, 79, 84, 91, 355/99, 103

[56] References Cited

U.S. PATENT DOCUMENTS

| | | | |
|---|---|---|---|
| 2,408,310 | 9/1946 | Hassler | 355/103 |
| 3,468,606 | 9/1969 | Wolf et al. | 355/91 |
| 3,606,536 | 9/1971 | Beispel | 355/91 |
| 3,740,140 | 6/1973 | Wolf et al. | 355/91 |
| 3,814,519 | 6/1974 | Zeunen et al. | 355/103 |
| 4,065,210 | 12/1977 | Milburn | 355/91 |

Primary Examiner—Richard A. Wintercorn
Attorney, Agent, or Firm—Harry R. Dumont

[57] ABSTRACT

A photographic exposure unit for making a reproduction of non-dimensional engineering drawings to very close tolerances. The original drawing and the film are driven by a travelling vacuum system through a light exposure unit. In all cases, the exposure is made while the original drawing and film are held in close contact one against the other during their conjoint passage through a flat exposure area.

16 Claims, 4 Drawing Figures

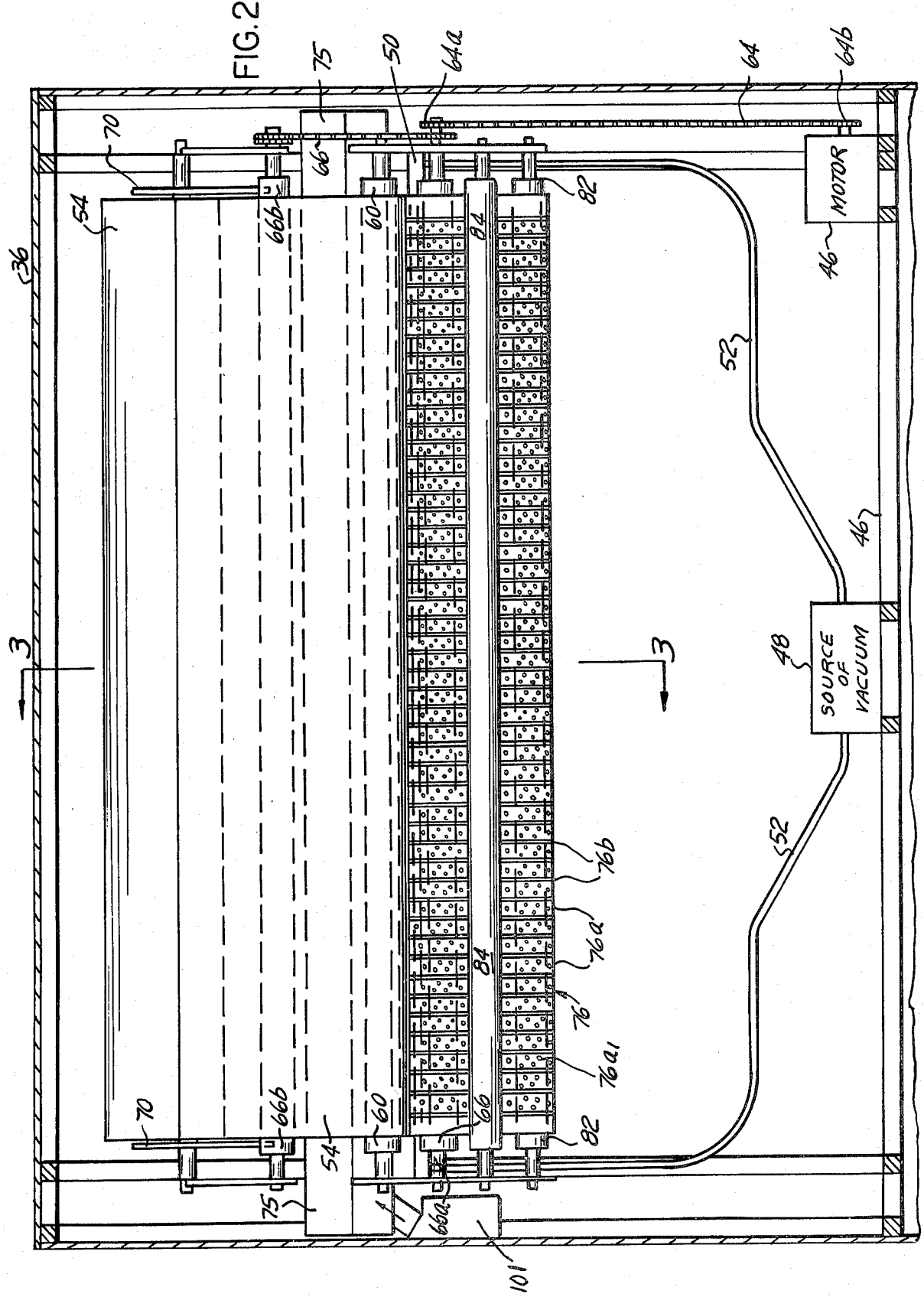

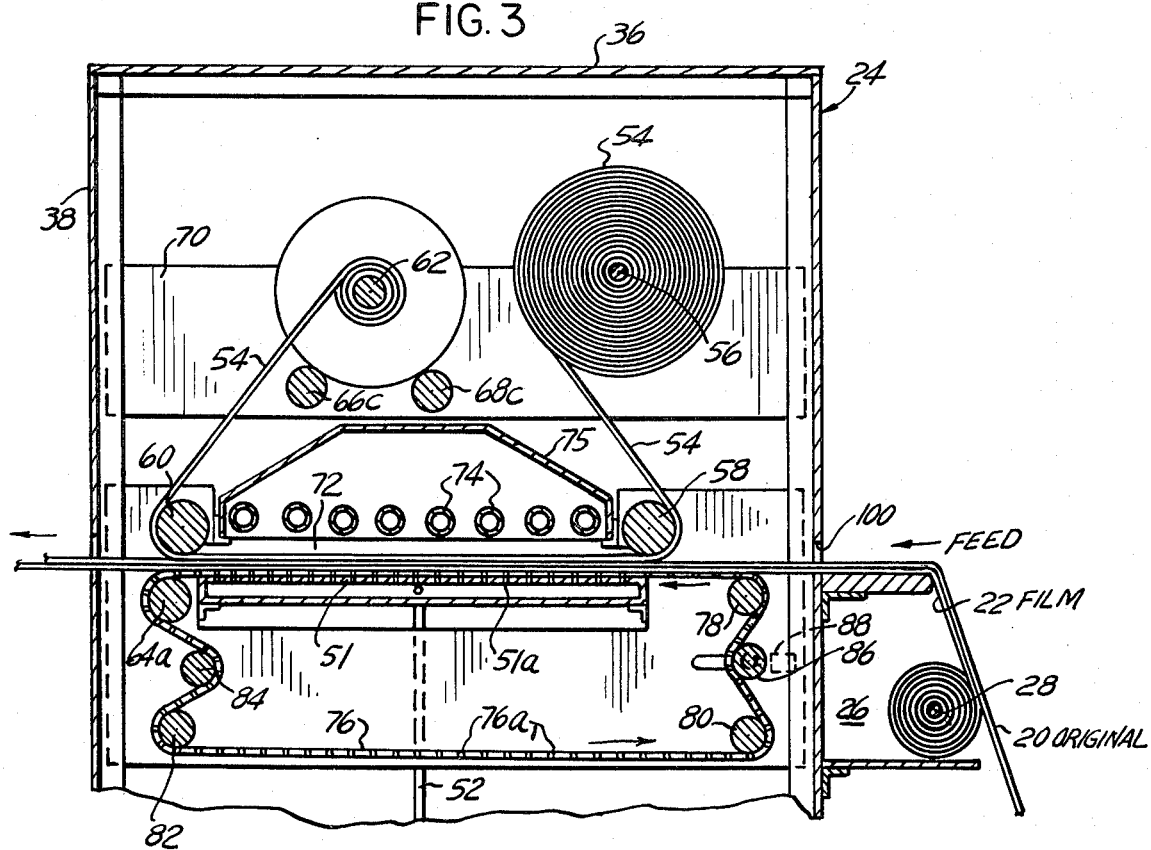

PHOTOGRAPHIC EXPOSURE APPARATUS

BACKGROUND OF THE INVENTION (a) Description of the Prior Art

In the reproduction of large production engineering drawings, large loft drawings and body drafts, the size of the original drawing to be reproduced, in many cases, may require it to be shipped to a special facility for photographic processing to make the necessary copies. Drawings of this type are generally made on large sheets of dimensionally stable material. The drawings themselves are, in many cases, in a constant process from day to day of being added to or changed in their detail. Copies of the drawings as they change should be made to provide up-to-date information to associated tool and die makers to eliminate delay in their operations. Portable exposure machines and those of the travelling light type are known to the prior art and such are disclosed in U.S. Pat. Nos. 2,292,668; 2,550,640; 3,254,856; 3,385,192. Some prior art photographic exposure units such as that shown and described in Zeunen et al, U.S. Pat. No. Re 28,770, sometimes employ static electricity in order to hold the film and drawing to be reproduced closely together during exposure. This approach requires long tables 20 or 30 feet in length or greater which are in a stationary position with lights and exposure units travelling over them. The efficiency of this type of unit is impaired because a large amount of set-up time is involved. In making the exposure, either a vacuum must be created or an electrostatic unit used. The original engineering drawings may be of a length as great as 50 feet and on an enlarged table, because of the length, would have to be spliced and aligned together for several exposures.

The apparatus according to the present invention is capable of running a continuous run, i.e., a continuous reproduction of an almost unlimited length engineering drawing without doing any splicing. Furthermore, the unit, in accordance with the present invention, requires very little mantime and floor space to make the reproductions. Viewing the efficiency in terms of time to make the reproduction, the present invention permits reproductions of large drawings to be made in about one third of the time possible with prior art systems.

(b) Field of the Invention

This invention relates to improvements in photographic exposure units of the type used to expose large sheets of film for production of extremely accurate photographic reproductions of the original drawing.

SUMMARY OF THE INVENTION

The present invention thus contemplates an improved exposure apparatus which can be used to make extremely accurate reproductions of drawings of the production engineering type thus eliminating costs of shipping and excess handling of the drawing. The film to be used with this apparatus may be a polyester film of the type such as "Mylar" or other dimensionally stable materials having a light sensitive coating thereon to provide a reproduction when exposed against the drawing original. There are various types of coatings in current use. Some of these are diazo-dye, i.e., ammonia developing material such as that used in the blueprint process. Others are of the silver emulsion type. A third type is that known as "wash-off" materials in which the emulsion is applied to what is known as an engineering base polyester. This third type is particularly useful during the development of extensive layouts. If the engineer desires to clean out an area of the entire drawing and make changes in it, he can wash off any given area and bring it back to the original condition of the polyester base thus to permit changes in that limited area.

BRIEF DESCRIPTION OF THE DRAWINGS

For a more complete understanding of the invention, reference may be had to the accompanying drawings illustrating a preferred embodiment of the invention in which like reference characters refer to like parts throughout the several views, and in which:

FIG. 2 is a sectional view taken along the section line 2—2 of FIG. 1;

FIG. 3 is a vertical sectional view taken along the section line 3—3 of FIG. 2; and FIG. 4 is a fragmentary sectional view showing the cooperative arrangement of the several sheets and the vacuum system used in the invention.

DETAILED DESCRIPTION OF THE PREFERRED EMBODIMENT

Figure 1:
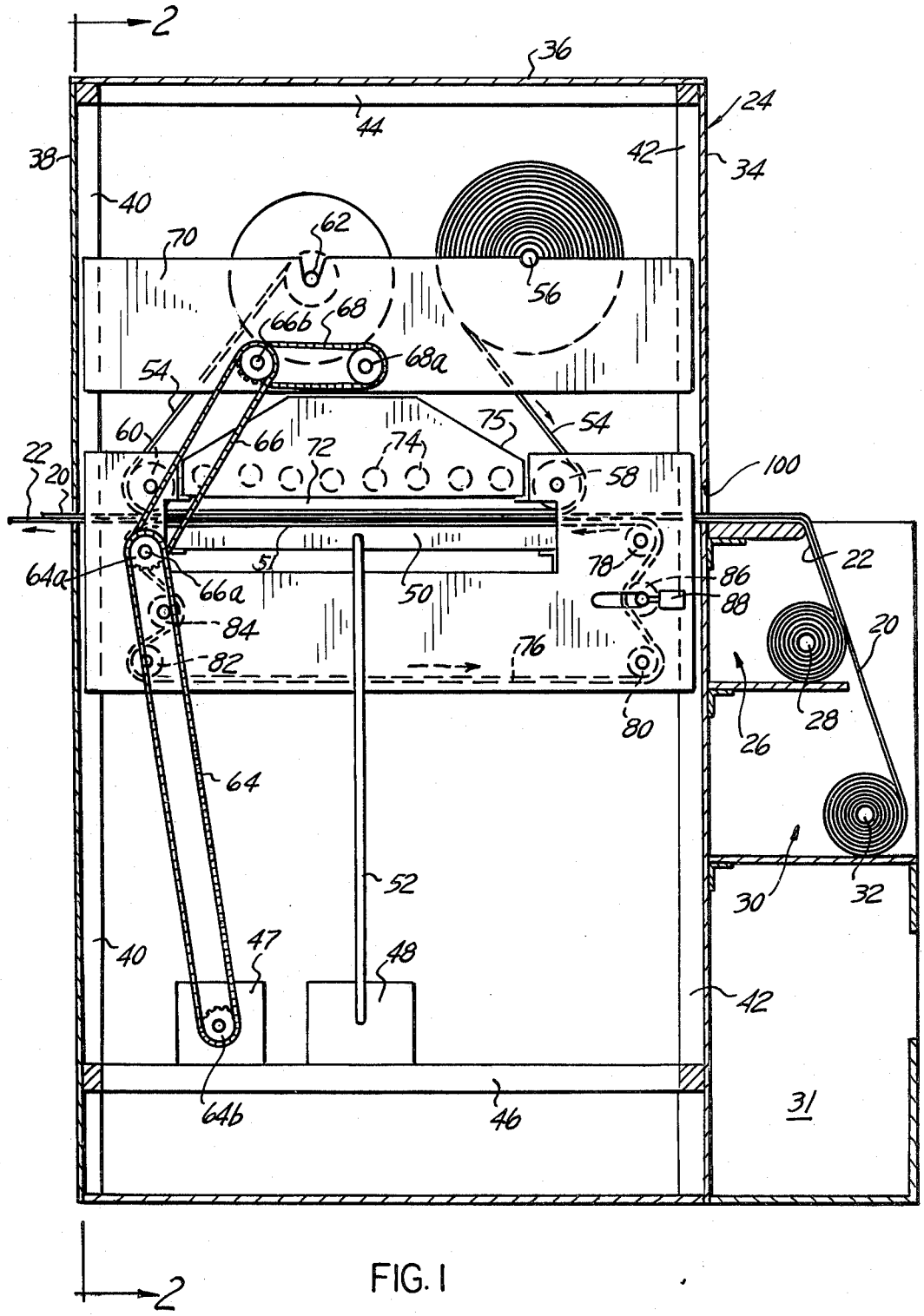
FIG. 1 is a left side elevational view of the apparatus with side plate removed to show essential parts of the operating system.

FIG. 1 shows the manner in which the original of the drawing 20 and the film 22 on which the copy is to be made are passed through the exposure apparatus 24 to make the photographic reproduction. The film 22 is supported in an upper transverse pocket 26 on a roller spool 28. The original drawing 20 is supported in a lower transverse pocket 30 on a roller 32 for movement upwardly and then leftward feed into the exposure unit 24. The exposure unit 24 itself includes a front plate 34, a top cover 36 and a rear plate 38 all mounted on a frame including vertical frame members 40, 42 and horizontal frame members 44, 46. Interior of the unit 24 there is included a drive motor 47 and a vacuum source 48. Transport of the film 22 and the original drawing 20 is achieved by the operation of a vacuum chamber 50 in communication with the vacuum source 48 through a line 52. A further transparency sheet 54 is used to provide a conjoint drive from a right to left hand direction of the film 22 and original drawing 20. To provide this drive and to allow for vacuum envelope, the transparency 54 is mounted on a storage reel 56 and then unwound about guide rollers 58 and 60 by the rotation of a take-up reel 62. The take-up reel 62 is driven by the operation of the drive motor 47, a first toothed belt 64, a second toothed belt 66 and a third toothed belt 68. The several belts are each respectively mounted about associated drive gears which provide take-off one to the other. Those drive gears provided are as follows; gears 64a, 64b, which support and drive the belt 64, gears 66a and 66b which support the belt 66, and finally the gear 68a which in conjunction with gear 66b carries the belt 68. The driving relationship of the several belts and gears will be further clarified in connection with FIG. 2 hereinafter.

As the drawing reproduction progresses and the original drawing 20 and film 22 are fed through the exposure unit, a web from the transparency 54 will be taken from its storage reel 56 and gradually wound over the take-up reel 62. The two reels 56, 62 are stored in one of a pair of notched side frames 70 and are readily interchanged to provide substitution of a full for an empty reel. The actual exposure of the film 22 is accomplished in the exposure chamber 72. The light chamber 75 contains a plurality of light bulbs 74 supported in spaced parallel relationship therein. It is possible to vary the number of the bulbs 74 being used in accordance with the particular drawing and the film material being used by an electrical means such as a switch for selectively actuating one or more of the bulbs. The drive mechanism for the original drawing 20 and the film 22 includes a perforated belt 76 which is maintained in planar registration across the flat upper surface of the vacuum chamber 50. The upper surface includes a flat plate 51 having a plurality of openings 51a formed therethrough as best shown in FIGS. 3 and 4 hereinafter. The perforated belt 76 is of a configuration which will be better shown in FIG. 2 hereinafter. The drive for the perforated belt 76 is provided by a cross-shaft coupled to the drive gear 66a which takes its drive from the motor 47. The perforated belt 76 is further supported and guided in its path of travel by a plurality of spaced rollers 78, 80, 82, 84, and 66a, as shown. A further adjustable roller 86 is included to adjust the tension on the perforated belt 76 through the operation of a rotatable tension control 88 through the front control panel of the exposure unit 24.

Also shown in FIG. 1 is a lower storage compartment 31 included at the front end of the exposure unit 24. This may be used for storing additional rolls of film 22 or other materials. FIGS. 2 and 3 provide a further showing of the detail and operation of the travelling vacuum system used to move the film 22 and original drawing 20 leftwardly through the exposure chamber 72.

FIG. 4 clarifies the manner in which the upper flat plate 51 of the vacuum chamber 50 is constructed. It will be seen that the upper flat plate 51 contains a plurality of substantially vertical openings 51a extending therethrough. As the perforated belt 76 passes across the upper surface of the plate 51, the openings 76a1 formed in the perforated belt 76a1 progressively pass into and out of registration with openings formed below it through the upper surface 51 of the vacuum chamber 50. In this manner there is a force of vacuum which moves the composite layers of the film 22 and of the original drawing 20 together at a constant rate in a leftward direction through the exposure chamber 72. This system provides a uniform movement without slippage of both film and original so that the exposure is accomplished in a uniform, predictable and highly accurate manner.

The envelope which forms the travelling vacuum system is completed on the upper surface by the travel of the transparency web 54. The general configuration of the belts and of their openings which provide the travelling vacuum system is best shown in FIGS. 2 and 4. With reference to FIG. 2, the openings 76a1 are formed in spaced, perforated sections 76a. Each of the perforated sections 76a is separated by an unperforated section 76b of lesser width. It has been found that this arrangement of openings, i.e., of perforated sections and unperforated sections, provides the necessary degree of leakage of the system and prevents lockup of the vacuum system in such manner as to intermittently hold the film and drawing stationary together during what should be a constant velocity path through the exposure chamber 72.

It is also important to note that the flat plate 51 at the upper surface of the vacuum chamber 50 assists in maintaining tight and accurate registration between the surfaces of the opposed film 22 and original 20 so that accuracy of the copy being made is assured.

DESCRIPTION OF OPERATION

The present invention will now be described with reference to the several drawings in a manner believed to clarify its mode of operation, its construction, and the particular advantages derived therefrom.

In operating the system, a roll of film 22 mounted on a reel 28 and an original drawing 20 mounted on a reel 32 are placed in their respective pockets 26, 30 at the front of the exposure unit 24. The two sheets are fed together through an inlet opening 100 formed at the front of the machine which is preferably somewhat wider than the maximum width of the film 22 and the drawing 20 to be reproduced to permit their accurate registration as feed is begun. The two webs are thus threaded into the opening 100 and leftwardly into the exposure chamber 72. A suitable number of light bulbs 74 are electrically coupled to a source of potential (not shown) in a manner known to the art whereby the total intensity of the light directed to the exposure chamber 72 is predetermined. The time length of the exposure to be made may likewise be adjusted through the speed of the motor 46 which in turn controls the rate of travel of the film 22 and the drawing 20 through the exposure chamber 72. This may be done through the use of a rheostat (not shown) in a manner well known in the art.

Once the two layers of original drawing 20 and film 22 are properly registered, they are then driven forwardly by the operation of the perforated belt 76 as indicated in FIG. 4. The necessary envelope to provide functioning of the vacuum is furnished by the upper transparency 54 web which is driven in a like direction from right to left through the exposure unit 24. The transparency 54 may alternately be formed in a continuous driving web to simplify that portion of the mechanism. It has been found in the operation of the system that a suitable source of pressurized cooling air 101 as shown in FIG. 2 should be applied to the light chamber 72 to prevent damage to the film and drawing passing therethrough.

In the operation of the travelling vacuum provided by the belt 54 and the other layers below it, it has further been found that the perforated holes formed in the web 76, namely opening 76a1, should constitute approximately 40% of the total surface of the belt 76.

The arrangement provided by my invention therefor provides the function of moving the film 22 and drawing original 20 along with the other drive webs through the unit without permitting locking or retarding them. It further provides passage of these at a constant and uniform rate which further contributes to the uniformity relative to the accuracy and detail of the reproduction obtained. It will be understood that the smooth drive provided by my system offers a considerable improvement over the prior art systems which necessarily included a number of drive variables in them.

Also, the arrangements of belts and openings therethrough, in accordance with the present invention, prevents any possible vacuum lockage and further contributes to the uniform and constant speed of travel during exposure of the film.

It will thus be seen that I have provided by my invention a novel and improved system of the travelling vacuum type for exposing engineering drawings over an almost unlimited size range to make highly accurate reproductions.

I claim:

1. An exposure apparatus for making a photographic reproduction of an original drawing including an elongated sheet of film for reproducing the drawing, comprising:
   a light chamber for exposing the drawing;
   a first belt of transparent material movable in contact with the drawing and movable with the drawing and the film through the light chamber;
   a second belt of perforated material;
   means for driving the second belt of perforated material movable with the film and the drawing through the light chamber;
   a vacuum chamber having a planar surface portion juxtaposed to the light chamber and further having a plurality of holes formed in it; and
   a source of vacuum connectable to said vacuum chamber for providing a travelling vacuum system for moving the film and drawing original in accurate and close registration over said planar surface portion and through said light chamber.

2. The combination as set forth in claim 1 wherein a spaced storage reel and a take-up reel are included and wherein said belt of transparent material is movable between said reels.

3. The combination as set forth in claim 1 wherein said light chamber is substantially co-extensive in length with said vacuum chamber planar surface portion.

4. The combination as set forth in claim 1 wherein said light chamber includes a plurality of selectively actuable lights.

5. The combination as set forth in claim 1 wherein a tension adjusting means is operatively connected to said perforated belt.

6. The combination as set forth in claim 1 wherein said film and said original drawing are of a web configuration, each of said webs mounted on a different reel for unwind therefrom.

7. The combination as set forth in claim 6 wherein said two reels are rotatably mounted in vertically spaced enclosures proximate the forward portion of the exposure apparatus.

8. A film and original drawing transport system for an exposure apparatus for making a photographic reproduction of an original drawing on a film including an upper web of transparent material;
   an opposed lower web of perforated material;
   said webs containing the film and original drawing therebetween;
   means for driving said webs in the same direction;
   a light exposure chamber for exposing the film;
   a vacuum chamber having a flat upper portion mounted in said light chamber and a plurality of spaced openings extending through such portion and alignable into and out of registration with the openings of the perforated material web during its movement;
   said two webs movable in unison for carrying the film and original drawing therebetween through said light chamber; and
   a source of vacuum operably connected to said vacuum chamber thus providing a force for holding the film and original drawing together in firm registration during their movement through the exposure chamber.

9. The combination as set forth in claim 8 wherein said first web is supported for movement between a storage reel and a take-up reel and wherein said drive means is operatively connected to the take-up reel.

10. The combination as set forth in claim 8 wherein said web of perforated material is movable over a plurality of spaced rollers and wherein a tension adjusting means is operatively connected to such web intermediate a pair of said rollers.

11. The combination as set forth in claim 8 wherein said original drawing and film are each supported on a separate reel for unwind therefrom.

12. The combination as set forth in claim 11 wherein said film and said original drawing and their associated reels are each supported for rotation in a different enclosure, vertically spaced one from the other.

13. The combination as set forth in claim 8 wherein said driving means includes a motive means and means for selectively adjusting its speed of operation thus to control the time of exposure of said film.

14. A transport system for a photographic exposure apparatus and for driving an original drawing and a film therethrough to expose a copy on the film, comprising:
   an upper imperforate belt of transparent material;
   a lower perforated belt;
   said belts operable to engage the drawing and the film respectively therebetween thus holding one to the other;
   a vacuum source;
   said perforated belt movable into and out of operative relationship with said vacuum source for providing conjoint movement of the two belts and said film and drawing.

15. The combination as set forth in claim 14 wherein said perforated belt includes a plurality of spaced portions having openings extending therethrough.

16. The combination as set forth in claim 14 wherein said vacuum source comprises a vacuum chamber including an upper planar surface portion having a plurality of spaced openings formed therethrough, said perforated belt slidable over such surface portion during its movement.

* * * * *